UNITED STATES PATENT OFFICE.

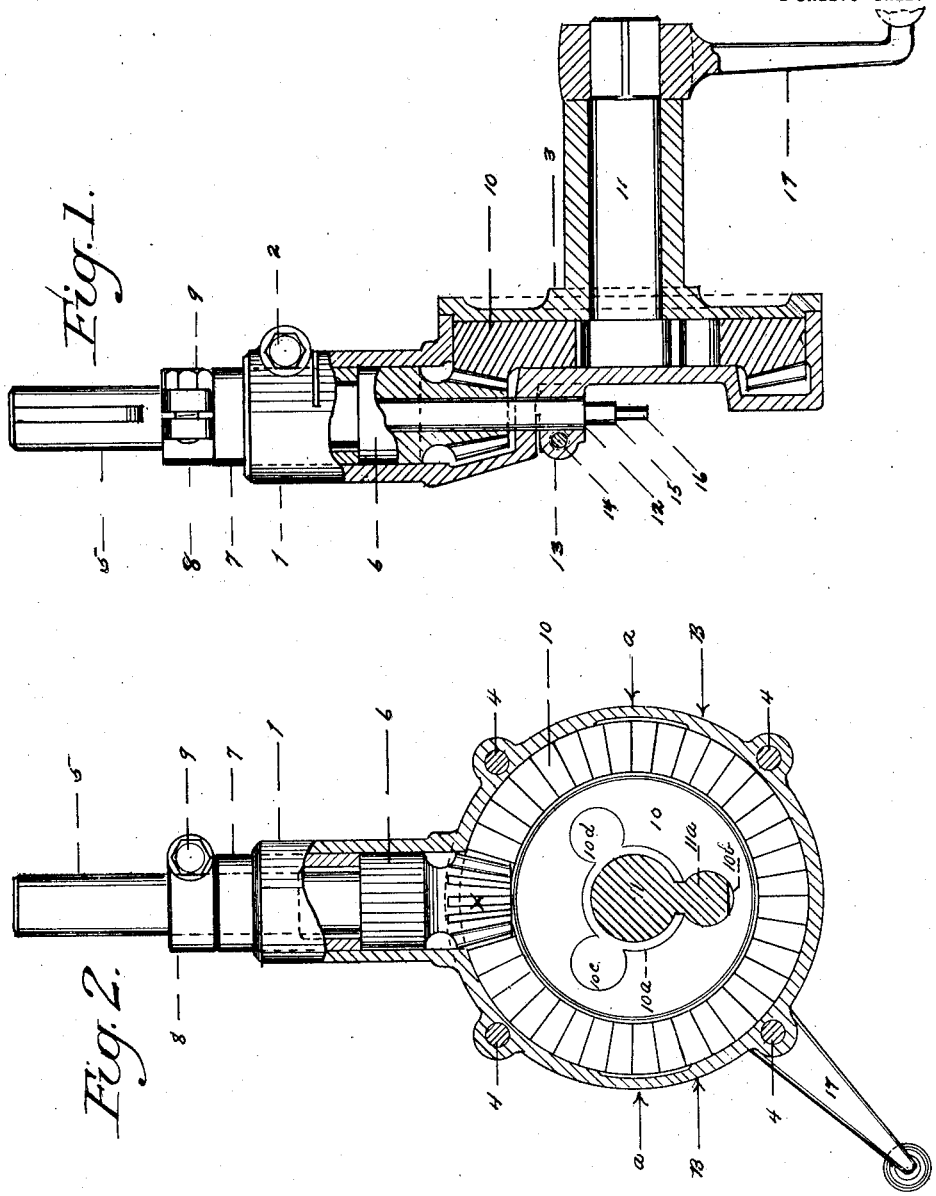

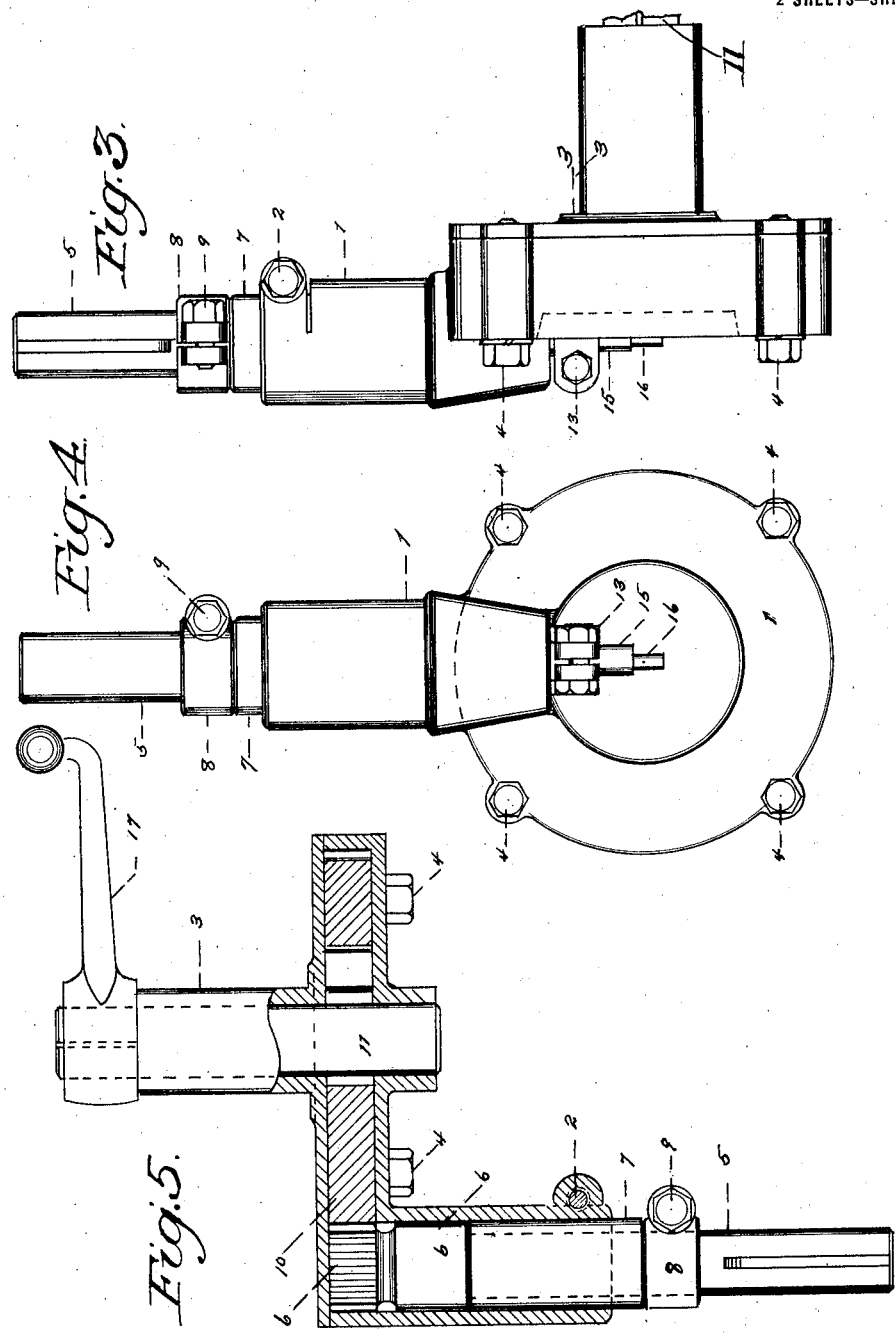

WILLIAM H. APPLEMAN, OF BELMONT, NEW YORK.

STEERING-GEAR FOR MOTOR-VEHICLES.

1,345,308.  Specification of Letters Patent.  Patented June 29, 1920.

Application filed March 25, 1919. Serial No. 285,075.

*To all whom it may concern:*

Be it known that I, WILLIAM H. APPLEMAN, a citizen of the United States, and a resident of Belmont, in the county of Allegany and State of New York, have invented a new and useful Improvement in Steering-Gears for Motor-Vehicles, of which the following is a specification.

My invention relates especially to that portion of the steering mechanism which actuates what is termed the steering arm.

The object of my invention is to provide a steering device of superior strength and durability, exceptional accessibility of interior parts, simplicity of adjustment in case of wear, and at the same time greatly reduce the cost of construction.

I attain the foregoing objects in the mechanism illustrated in the accompanying drawings, in which—

Figure 1 is a longitudinal front view partly in section, with portions removed in order to afford an unobstructed view of interior parts of the working mechanism.

Fig. 2 is a longitudinal side view partly in section with portions removed in order to afford an interior view.

Fig. 3 is a longitudinal front view of my device assembled, less the steering arm.

Fig. 4 is a longitudinal side view of my device assembled.

Fig. 5 is a longitudinal side view partly in section, with portions removed to afford an interior view of the interior parts, and relates distinctly to one form of modification which may readily be adopted without departing from the spirit of my invention.

Like symbols indicate like parts throughout the various figures.

In Figs. 1 to 4 inclusive, a suitable housing is provided for inclosing and maintaining alinement of the working mechanism, and consists of a hollow casing containing a tubular longitudinal chamber and a circular open pan shaped transverse chamber, the latter lying parallel with the tubular chamber, and both of which are internally machined throughout. The longitudinal chamber being so machined and slotted as to adapt a portion of it to contraction, which is effected by the application of compression bolt 2. A circular plate 3 carrying a central sleeve type extension serves to close the pan shaped opening of casing or housing 1, and is secured thereto by bolts 4. Said plate is machined on its inner side and the sleeve portion thereof is machined internally and externally thereby adapting it to securement to the vehicle, as well as for centrally supporting other parts hereinafter referred to. A steering post 5, which may be either solid or tubular is inserted within the tubular chamber of housing 1, and carries a rigidly attached pinion 6. This pinion is so located as to extend within the transverse chamber of housing 1. It also contains an untoothed extension slightly larger in diameter than the toothed portion, and this enlarged portion lies entirely within, and is journaled upon the inner walls of the tubular chamber of housing 1. Steering post 5, is further supported by means of a sleeve, 7, the outward end of which is bored to a journal fit on said steering post, while its outer diameter is turned to a neat fit in the tubular chamber of housing 1. Said sleeve 7 being locked in position by means of compression bolt 2. Steering post 5 is secured against lateral motion by means of a clamp or compression ring 8 and bolt 9.

A flat ring type gear 10 peripherally machined to a journal fit against the inner circular walls of the transverse chamber of housing 1 is inserted in said transverse chamber, and in such position as to bring its teeth into working engagement with those of pinion 6. The parallel side surfaces of ring gear 10 are so machined as to bring it to a working or sliding fit against plate 3, and the flat inner surface of housing 1. Ring gear 10 is provided with a central open chamber, $10^a$, and lying diametrically outside of chamber $10^a$ and about 40% of the gear's radius distant from the center thereof, a plurality of smaller chambers, $10^b$, $10^c$ and $10^d$, are arranged so as to lie parallel with said central chamber $10^a$ and transversely with said steering post.

A rocker shaft, 11, carrying a short crank arm $11^a$, is journaled and so supported within the sleeve extension of plate 3, as to bring its axis directly in line with the center of ring gear 10, and to also render the short crank arm adaptable to direct yet flexible engagement within any one of the smaller chambers designated as $10^b$, $10^c$, and $10^d$.

Rocker shaft 11 is also of such length as to cause it to extend out of said sleeve support, at which point it may be squared, or otherwise prepared to receive a steering arm such as 17 or its equivalent, parts indicated by symbols 12—13—14—15 and 16 relate to spark and fuel control devices of a type now in use and therefore form no part of my real invention.

Fig. 5 presents a form of modification in which spur type gearing may be used without in any wise departing from the spirit of my invention. It is introduced as illustrative and suggestive only, therefore reference to its symbols are omitted, but it is evident that my device is susceptible of designs which will adapt it to gears of the spur type or those of any desirable bevel.

In operation the device is exceedingly effective, turning steering post 5, to either the right or left carries pinion 6 with it, which in turn rotates ring gear 10 in a corresponding direction, and as arm 11$^a$ of rock shaft 11 is confined within chamber 10$^a$ of ring gear 10, shaft 11 is caused to rock in perfect unison with said ring gear, in fact fully as much so as if ring gear 10 was rigidly mounted directly on rocker shaft 11.

If, however, a rotative force be applied to steering arm 17 and thereby to rocker shaft 11, the flexible engagement formed by arm 11$^a$ in chamber 10$^a$, tends to force ring gear 10, sidewise and concentrates its frictional contact with the housing at the point indicated by darts B, and which is but a short distance from dart A or what might be termed a dead center. This side thrust is further augmented by reason of arm 11$^a$ being short while the frictional resistance by reason of being transferred to a point so far diametrically outside of the point of engagement of arm 11$^a$ with ring gear 10 causes said friction to almost wholly overcome all rotative tendency of ring gear 10, thereby reducing the thrust of the latter upon pinion 6 to such a minimum that its force when exerted through the ordinary steering wheel, is scarcely detectable, thus rendering the device (in steering gear parlance) irreversible and fully equal in this respect to the best worm and sector or pinion steering gears now in use. Two special features of construction which I wish to emphasize may also be made to contribute to this irreversible tendency, the first being that the tubular chamber of housing 1 is bored to fit the extension of pinion 6, and that pinion 6 is journaled well outside of its total as well as average pitch diameter, or point of contact with ring gear 10. The second feature being due to a clearance zone which may be formed when desired between housing 1 and ring gear 10, as indicated right opposite darts A. In fact by reducing or extending the length of this zone, any desired measure of, or absolute irreversibility may be obtained, without causing any noticeable increase of resistance when it is desired to rotate ring gear 10 and rocker 11 by means of steering post 5. In order, however, to obtain the maximum frictional resistance of ring gear 10, when a blow or force is delivered through steering arm 17 and rocker shaft 11, it is essential that the device be so assembled as to cause arm 11$^a$ of rocker 11 to point as directly as possible away from pinion 6 and whereby rocker 11 is caused to lie between pinion 6 and arm 11$^a$.

Among the special advantages of my device is the fact that pinion 6 can be entirely withdrawn or its engagement changed without otherwise dismantling my device. Also plate 3 and rocker 11 can be quickly disconnected, and ring gear 10 can then be rotated until either chamber 10$^c$ or 10$^d$ are brought in line with arm 11$^a$, after which plate 3 and rocker 11 can be quickly secured in their natural working relations.

I do not wish to limit my invention exclusively to locating the axis of the rocker shaft absolutely on a line with the axis of the large gear wheel, but so near to it that the axis of said gear wheel and the axis of said rocker shaft, when radially considered, shall both lie well inside of the point of flexible engagement between said gear wheel and said rocker shaft.

What I claim is:

1. The combination of a fixed annular bearing, a rotatable gear wheel peripherally journaled against the walls of said annular bearing, a central chamber in said gear wheel, a rocking member entering said chamber in said gear wheel, a flexible connection between said rocking member and said gear wheel at a point which when radially considered in relation to the center of said gear wheel, lies outside of the axis of said rocking member and means for rotating said gear wheel.

2. The combination of a fixed annular bearing, a rotatable gear wheel peripherally journaled against the walls of said annular bearing, a rotatable member operably connected with and rotating said gear wheel, a rocker shaft having the same axis as said gear wheel, and a crank arm on said rocker shaft extending outward from said axis and flexibly engaging with said gear wheel.

3. The combination of a fixed annular bearing, a rotatable gear wheel peripherally journaled against the walls of said annular bearing, a central chamber in said gear wheel, a plurality of smaller chambers in said gear wheel lying diametrically outside of said central chamber, a rocking member having the same axis as said gear wheel, an arm on said rocker that is adapted to engage respectively with each or either of said smaller chambers, and means for rotating said gear wheel.

4. The combination of a fixed annular bearing, a rotatable gear wheel peripherally journaled against the walls of said annular bearing, a central chamber in said gear wheel, a plurality of smaller chambers in said gear wheel lying diametrically outside of said central chamber, a rocker shaft having the same axis as said gear wheel, a crank arm on said shaft that is adapted to engage respectively with each or either of said smaller chambers, means for rotating said gear wheel and a steering arm on said rocker shaft.

5. The combination of a fixed annular bearing, a rotatable gear wheel peripherally journaled against the walls of said annular bearing, a steering post carrying a pinion which engages with said gear wheel, a rocker shaft, a crank arm on said shaft which engages with said gear wheel, and which when in its central operative position, lies on the opposite side of said rocker shaft from said pinion, and a steering arm actuated by said rocker shaft.

6. The combination of a housing having a tubular longitudinal and a circular transverse chamber therein, a gear wheel inserted in said transverse chamber, a rocking member operatively connected with said gear wheel, a steering post inserted in said tubular chamber, a pinion actuated by said steering post and engaging with said gear wheel, an extension of said pinion that is of greater diameter than its toothed portion, said pinion being journally supported by reason of said extension having a journaled bearing against the inner walls of said tubular chamber.

7. The combination of a housing having a tubular longitudinal and a circular transverse chamber therein, a gear wheel inserted in said transverse chamber, a rocking member operably connected with said gear wheel, a steering post inserted into said tubular chamber, a pinion carried by said steering post that is of less diameter than said tubular chamber, and that is insertible and removable directly through the opening created by said tubular chamber and a working engagement between said pinion and said gear wheel.

8. The combination of a housing having a tubular longitudinal and a circular transverse chamber therein, a gear wheel inserted in said transverse chamber, a steering post inserted in said tubular chamber, a pinion carried by said steering post and engaging with said gear wheel, a sleeve of greater diameter than said pinion and turned externally to fit, and being insertible in said tubular chamber irrespective of rotation, said sleeve being also bored to fit and serving as both a lateral and journal support for said steering post, means for compressing said tubular chamber for the purpose of locking said sleeve rigidly in said tubular chamber and a rocking member actuated by said gear wheel.

9. The combination of a fixed annular bearing, a rotatable gear wheel peripherally journaled against the walls of said annular bearing, a rotatable member operably connected with and rotating said gear wheel, a rocker shaft the axis of which lies so near in line with the axis of said gear wheel as to bring the axis of the latter well within the outer diametrical boundary lines of said rocker shaft, and a flexible actuating engagement between said gear wheel and said rocker shaft.

10. The combination of a fixed annular bearing, a rotatable gear wheel journaled against the walls of said annular bearing, a rotatable member operably connected with and rotating said gear wheel, a central chamber in said gear wheel, a plurality of smaller chambers connected with and extending diametrically beyond said central chamber, a rocking member inserted in said central chamber and being provided with means for flexibly engaging respectively with each of said smaller chambers and whereby motion is imparted from said gear wheel to said rocking member.

11. The combination of a fixed annular bearing, a rotatable disk peripherally journaled against the walls of said annular bearing, a rocker shaft, an arm on said shaft which flexibly engages with said disk adjacent to the center thereof and which, in forming said engagement, points entirely away from the axis of said disk, and means for rotating said disk.

12. The combination of a fixed annular bearing, a rotatable disk peripherally journaled against the walls of said annular bearing, a rocking member having the same axis as said disk, an arm on said rocking member extending outward from the axis of said rocking member and flexibly engaging with said disk and means for rotating said disk.

13. The combination of a fixed annular bearing, a rotatable disk peripherally journaled against the walls of said annular bearing, a rocker shaft, the axis of which lies so close to the axis of said disk as to bring the axis of said disk well within the diametrical outlines of said shaft, and a flexible actuating connection between said disk and said shaft and means for rotating said disk.

W. H. APPLEMAN.

Witnesses:
Wm. H. Chapman,
John D. Nicholson.